(12) United States Patent
Shikaumi et al.

(10) Patent No.: US 6,233,405 B1
(45) Date of Patent: May 15, 2001

(54) CAMERA AND FILM CARTRIDGE DISPLAY SETTING APPARATUS

(75) Inventors: Masao Shikaumi, Tokyo; Yasuhiro Toyoda, Ohmiya, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/303,559

(22) Filed: May 3, 1999

Related U.S. Application Data

(62) Division of application No. 08/670,850, filed on Jun. 28, 1996.

(30) Foreign Application Priority Data

Jun. 30, 1995 (JP) .................................................. 7-165375
Jan. 31, 1996 (JP) .................................................. 8-015551

(51) Int. Cl.[7] .............................. G03B 7/24; G03B 19/02
(52) U.S. Cl. .......................... 396/207; 396/389; 396/390; 396/515
(58) Field of Search .................................. 396/207, 208, 396/211, 284, 285, 389, 390, 405, 406, 407, 408, 515, 516

(56) References Cited

U.S. PATENT DOCUMENTS

| | | | |
|---|---|---|---|
| 5,138,350 | 8/1992 | Cocca | 396/284 |
| 5,159,365 | 10/1992 | Takahashi | 396/285 |
| 5,414,482 | 5/1995 | Iwai et al. | 396/407 |
| 5,457,510 | 10/1995 | Yamazaki | 396/207 |
| 5,539,484 | * 7/1996 | Wakabayashi | 396/404 |
| 5,541,681 | * 7/1996 | Cocca et al. | 396/389 |
| 5,598,236 | * 1/1997 | Ueda et al. | 396/319 |
| 5,612,757 | 3/1997 | Amano | 396/319 |
| 5,614,971 | 3/1997 | O'Leary | 396/406 |
| 5,724,621 | * 3/1998 | Serita et al. | 396/284 |

FOREIGN PATENT DOCUMENTS

| | | |
|---|---|---|
| 2-114248 | 4/1990 | (JP) . |
| 4-301829 | 10/1992 | (JP) . |
| 4-349444 | 12/1992 | (JP) . |

* cited by examiner

Primary Examiner—Eddie C. Lee
(74) Attorney, Agent, or Firm—Fitzpatrick, Cella, Harper & Scinto

(57) ABSTRACT

A camera and a cartridge indicator setting apparatus adapted to a film cartridge including an indicator operatively coupled to a film supply spool provided in the film cartridge. The camera and the cartridge indicator setting apparatus includes a storage device which stores information to be indicated by the indicator of the film cartridge; and a setting device for driving, in response to an operation for ejecting the film cartridge which has been loaded on the camera, the film supply spool of the film cartridge which has been stopped after completion of rewinding of a film, and for setting the indicator of the film cartridge in accordance with the information stored by the storage device.

36 Claims, 13 Drawing Sheets

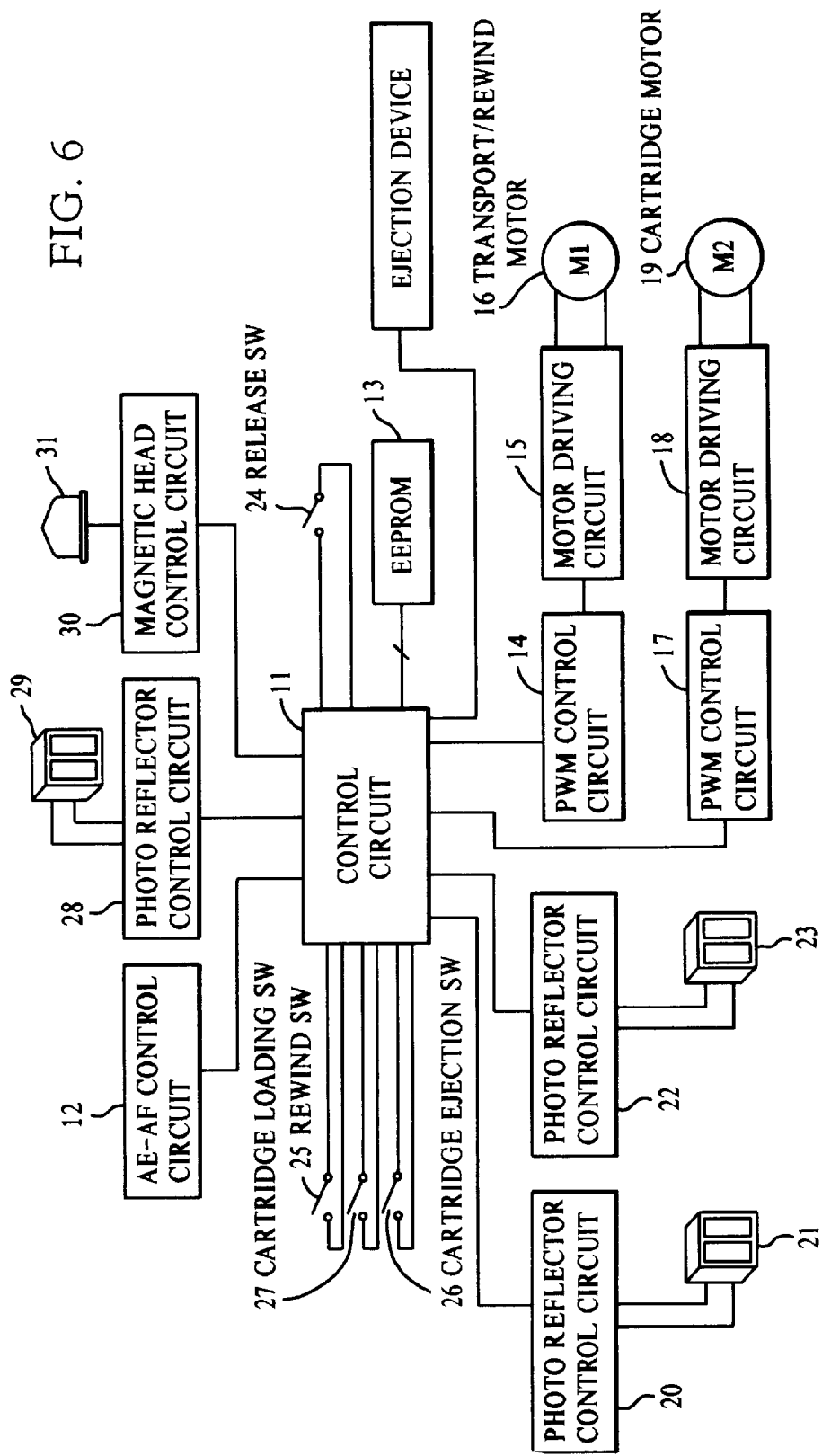

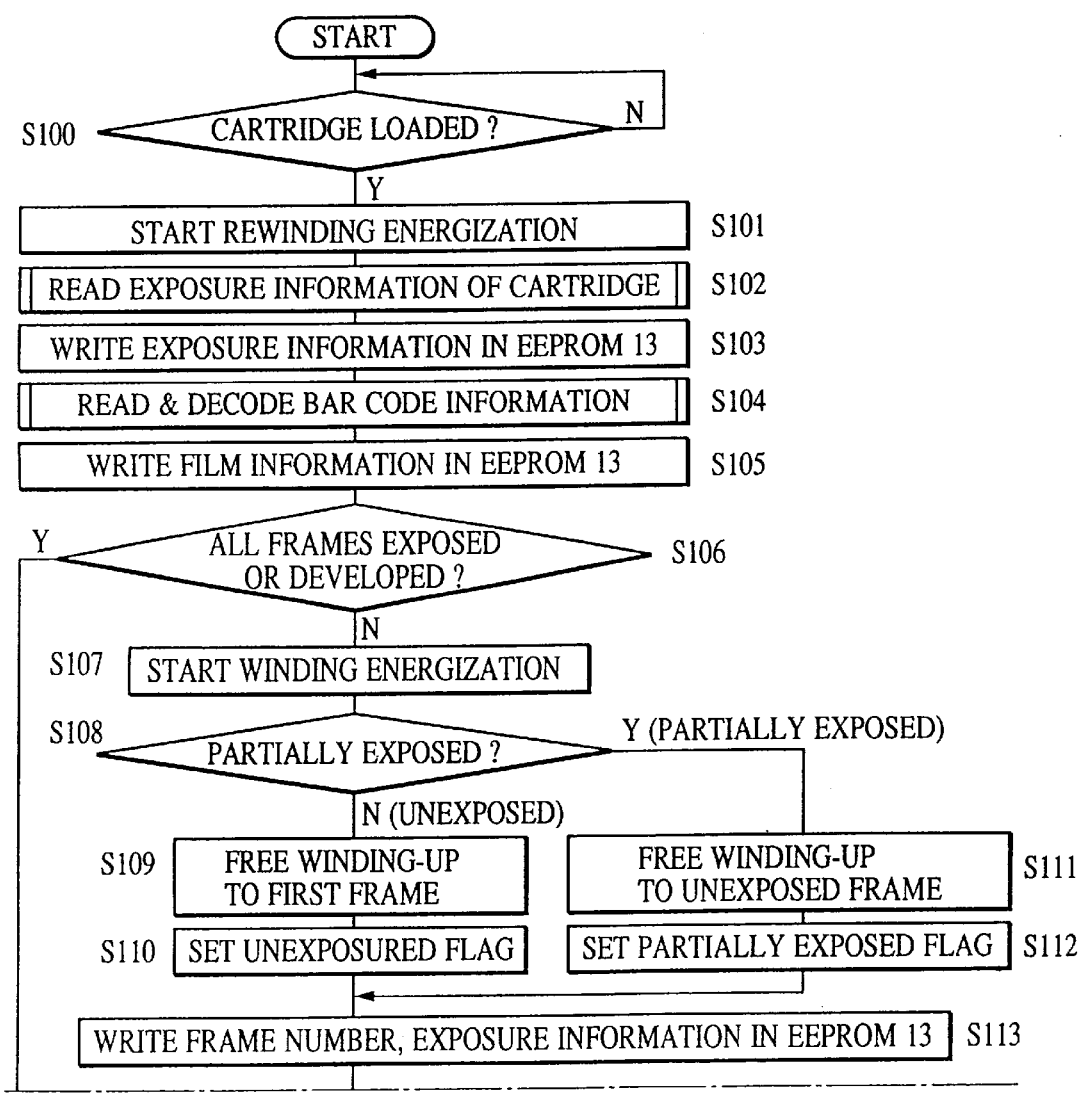

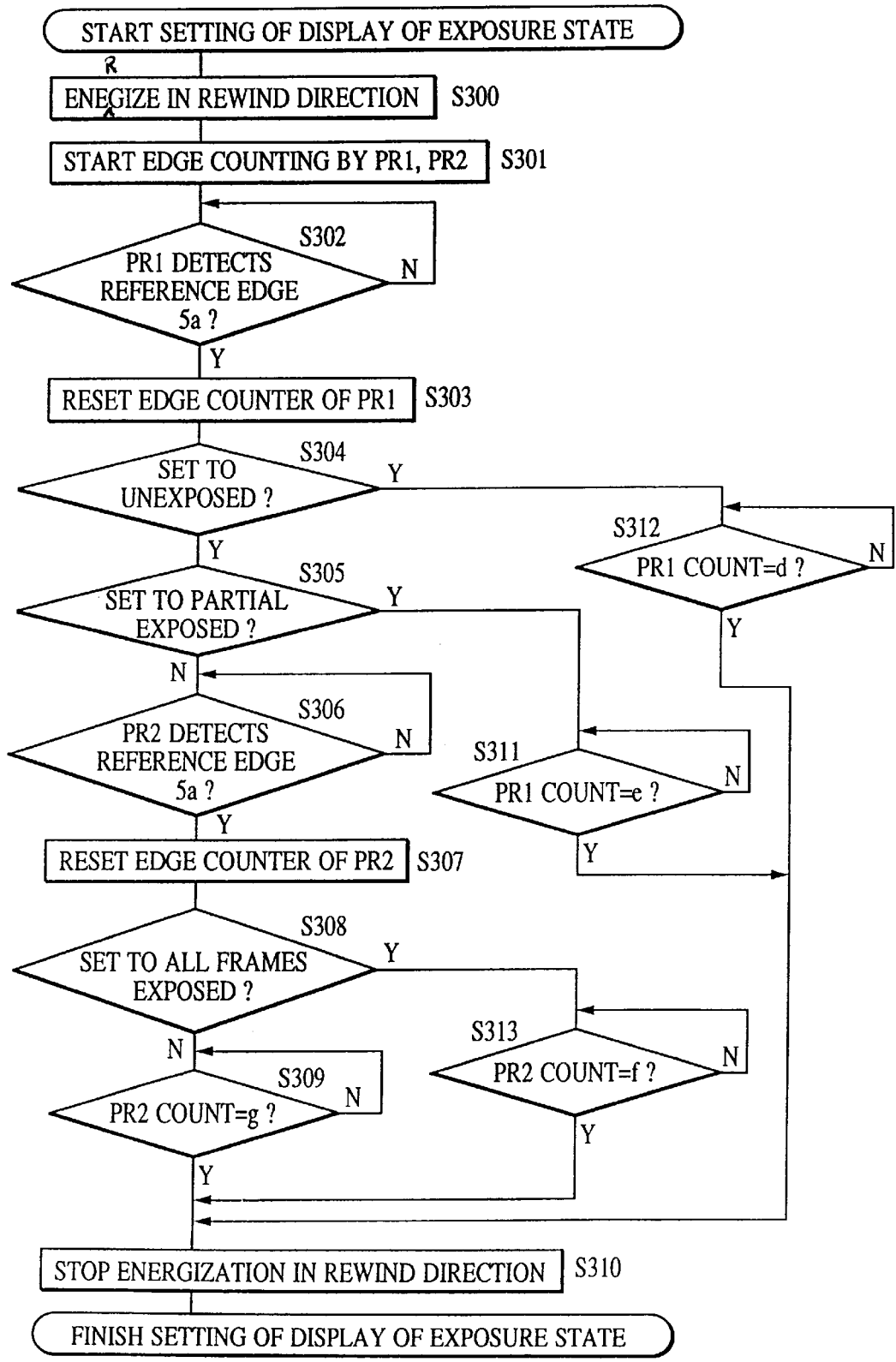

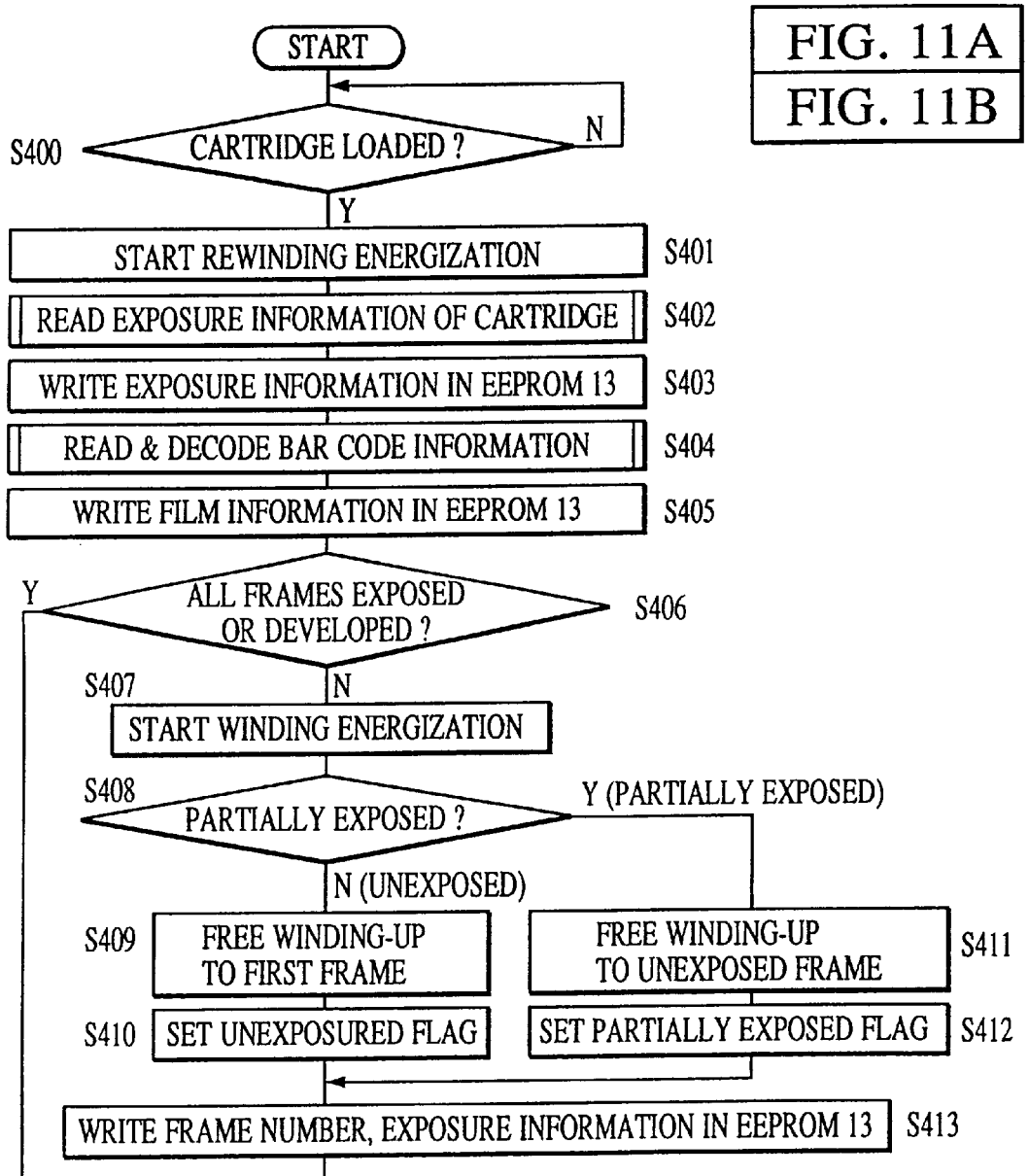

CAMERA AND FILM CARTRIDGE DISPLAY SETTING APPARATUS

This application is a division of copending application Ser. No. 08/670,850, titled Camera and Film Cartridge Setting Apparatus, filed Jun. 28, 1996.

BACKGROUND OF THE INVENTION

1. Field of the Invention

The present invention relates to a camera and a film cartridge display setting apparatus adapted to a film cartridge including a display means for displaying information as to whether a film is used or unused.

2. Description of the Related Art

Japanese Unexamined Patent Publication No. 2-114248 proposes a film cartridge which has means for displaying film information as to whether a film is unused (unexposed) or used (exposed) when the film cartridge is ejected from a camera. In addition, Japanese Unexamined Patent Publication No. 4-301829 proposes a film cartridge which has means for separately displaying film information as to whether all frames of a film are used for photographing (hereinafter, referred to as all-frames exposed) or part of the frames are used for photographing (hereinafter, referred to as partially exposed). The means for displaying the film information used in these film cartridges is operatively coupled to a film supply spool of the cartridge. After completion of rewinding of the film of the camera, the film supply spool is rotated to a predetermined rotation position following the rewinding operation, thereby setting a display of information in response to the predetermined rotation position.

However, in the event that the cartridge is not ejected from the camera after completion of rewinding of the film, e.g., after setting of the display of information, when vibration and shock are added to the camera, the film supply spool rotates, and the display of information is changed thereby. As a result, a state of the film different from the true state may be displayed, or the display may become unclear.

Japanese Unexamined Patent Publication No. 4-349444 proposes a method of clearly setting the display of the cartridge without being affected by vibration of the camera in which the film supply spool is rotated to a predetermined rotation position in mechanical association with the ejection of the cartridge so as to set the display of information upon ejection of the cartridge.

According to this method, however, only "all-frames exposed" is equally displayed even if the film is rewound in the "partially exposed" or "unexposed" state. As a result, the true state of the film may disagree with the displayed information.

SUMMARY OF THE INVENTION

According to one aspect of the present invention, there is provided a camera or a cartridge indicator setting apparatus adapted to a film cartridge including an indicator operatively coupled to a film supply spool provided in the film cartridge. The camera or apparatus comprises a storage device which stores information to be indicated by the indicator of the film cartridge; and a setting device for driving, in response to an operation for ejecting the film cartridge which has been loaded, the film supply spool of the film cartridge which has been stopped after completion of rewinding of a film, and for setting the indicator of the film cartridge in accordance with the information stored by the storage device, whereby the indicator of the cartridge to be ejected is always set correctly even if vibration and shock are added to the film cartridge which has been loaded on the camera or apparatus.

According to another aspect of the present invention, there is provided a camera or a cartridge indicator setting apparatus adapted to a film cartridge including an indicator operatively coupled to a film supply spool provided in the film cartridge. The camera or apparatus comprises a setting device for driving the film supply spool of the film cartridge loaded to set the indicator of the film cartridge after rewinding of a film; a determination device for determining whether it is necessary to reset the indicator of the film cartridge; and a control device for causing, in response to an operation for ejecting the film cartridge which has been loaded, the setting device to reset the indicator of the film cartridge when the determination device determines that it is necessary to reset the indicator, whereby the indicator of the cartridge to be ejected is always set correctly even if vibration and shock are applied to the film cartridge which has been loaded on the camera or apparatus, and whereby the cartridge can be promptly ejected.

Other aspects of the present invention will become apparent from the following description of the preferred embodiments.

BRIEF DESCRIPTION OF THE DRAWINGS

FIG. 6 is a block diagram which illustrates a circuit configuration of a camera according to the embodiments of the present invention;

FIG. 10 is a flowchart of steps for setting the exposure state; and

DETAILED DESCRIPTION OF THE PREFERRED EMBODIMENTS

The preferred embodiments of the present invention will be specifically described with reference to the accompanying drawings.

Figure 1:
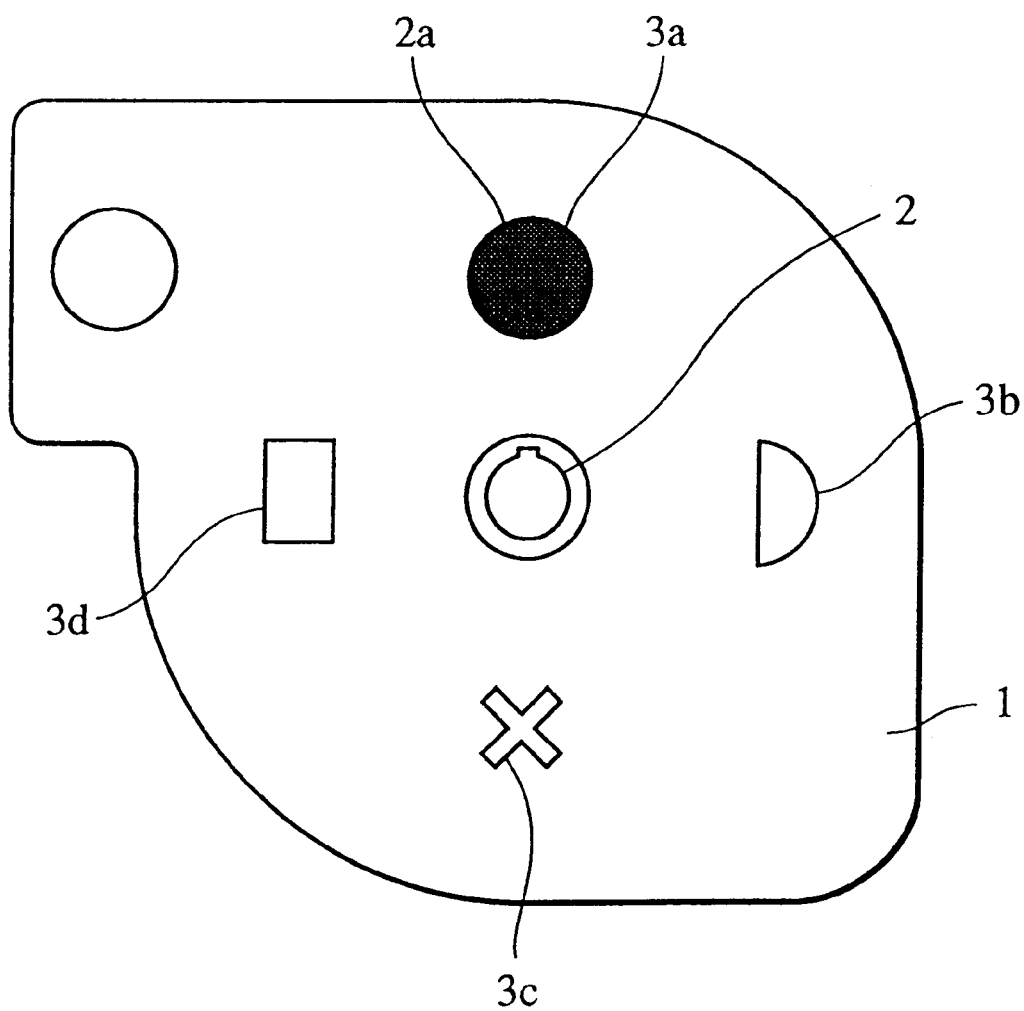
FIG. 1 is a top view which illustrates a film cartridge to be used in a first embodiment according to the present invention.

FIG. 1 is a top view of a film cartridge to be used in an embodiment according to the present invention. Referring to FIG. 1, there are provided a film cartridge 1 and a film supply spool 2 of the film cartridge 1. Display windows 3*a*, 3*b*, 3*c* and 3*d* display information (exposure state) of a film within the film cartridge 1. An index mark 2*a* which rotates integrally with the spool 2 within the film cartridge 1 is displayed through any one of the display windows 3a to 3d in accordance with a stop position of the spool 2, so that a user can recognize the film information. In order to make the film information recognizable to the user, each of the display windows 3a to 3d are formed into different shapes.

Figure 2A:
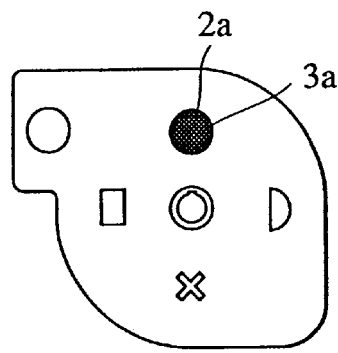
FIGS. 2A to 2D illustrate displays of the film cartridge of FIG. 1 in accordance with an exposure state of a film.
Figure 2B:
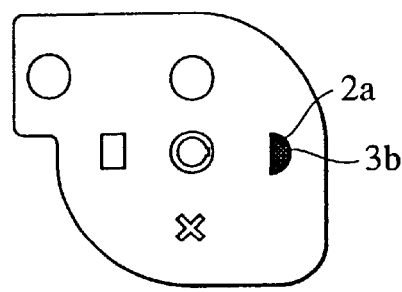
Figure 2C:
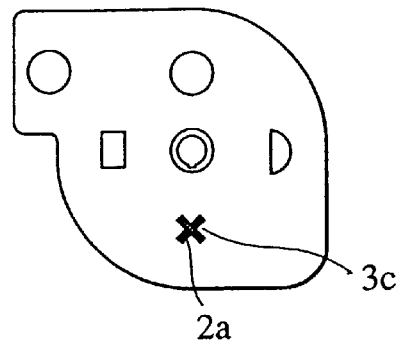
Figure 2D:
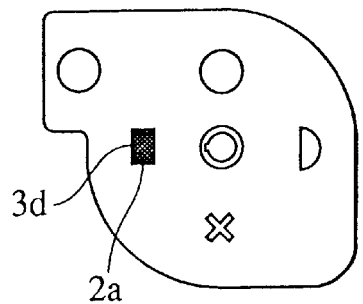

FIG. 2A illustrates a case where the index mark 2a is displayed through the display window 3a, which shows that the film is in an "unexposed" state. Similarly, FIG. 2B illustrates a case where the index mark 2a is displayed through the display window 3b, which shows a "partially exposed" state. FIG. 2C illustrates a case where the index mark 2a is displayed through the display window 3c, which shows an "all-frames exposed" state. and FIG. 2D illustrates a case where the index mark 2a is displayed through the display window 3d, which shows a "developed" state of the film. FIG. 1 illustrates a case where the index mark 2a is displayed through the display window 3a, e.g., a case where the film is in the "unexposed" state.

Figure 3:
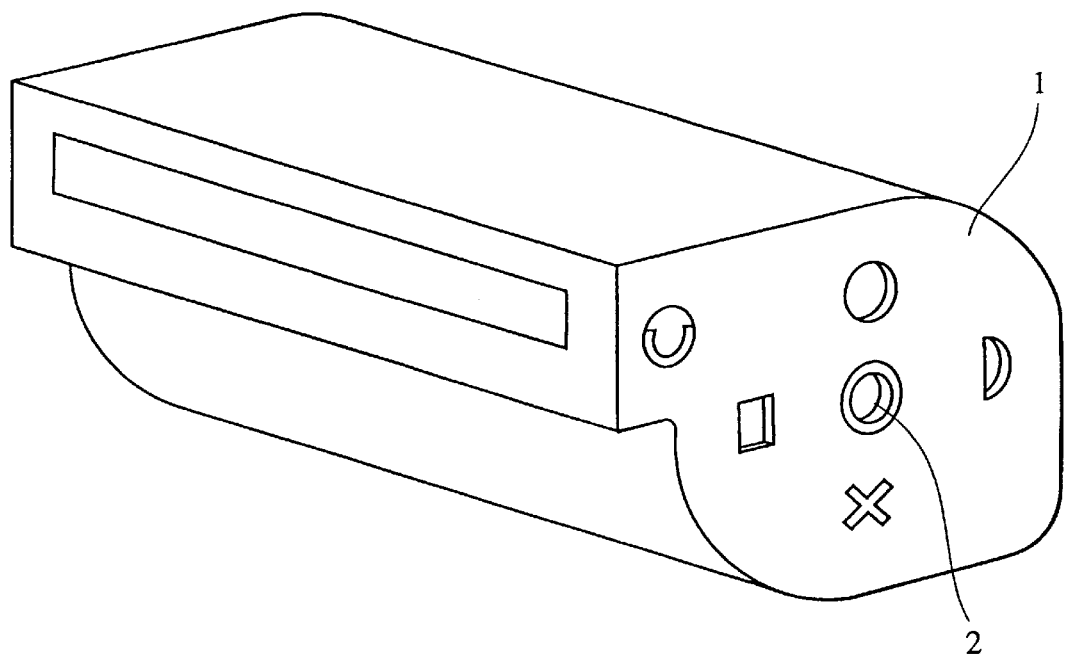
FIG. 3 is a perspective view of the film cartridge of FIG. 1.
Figure 4:
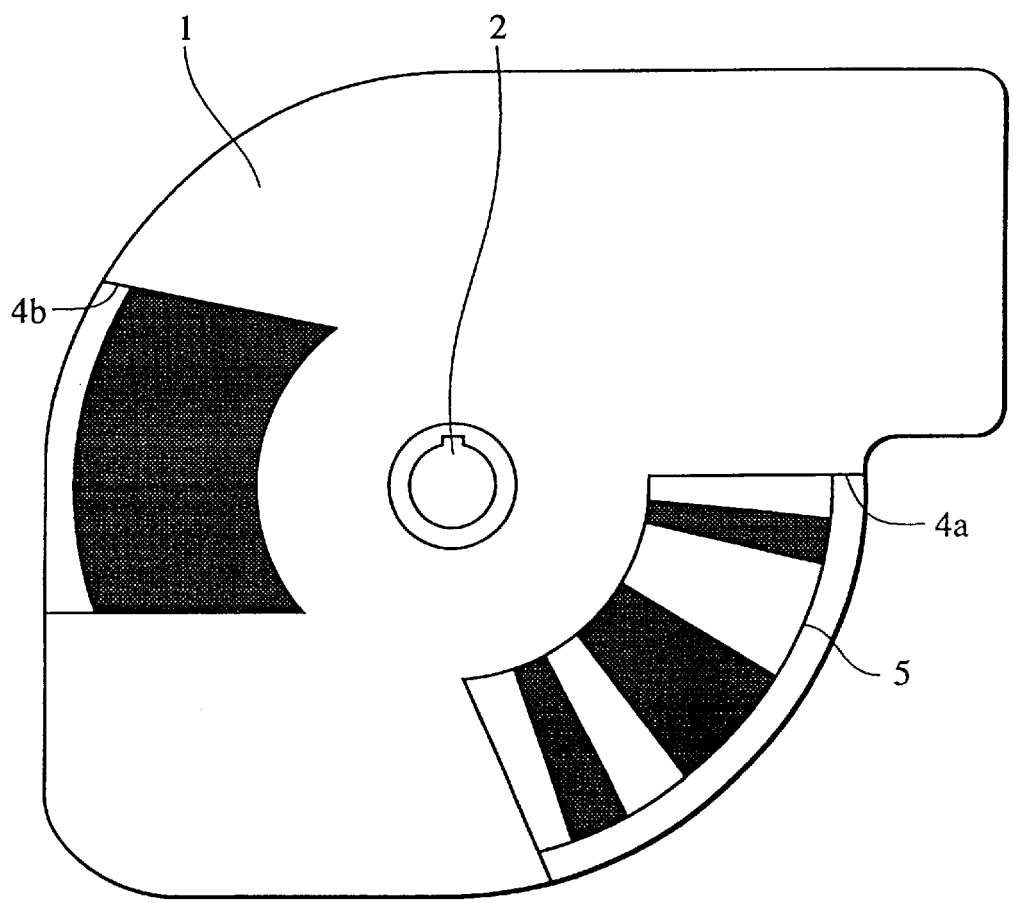
FIG. 4 is a bottom view of the film cartridge of FIG. 1.

FIG. 3 is a perspective view of the film cartridge 1 of FIG. 1; and FIG. 4 is a bottom view of the film cartridge 1 of FIG. 1.

Referring to FIG. 4, cutouts 4a and 4b are formed in two sections of the bottom surface of the film cartridge 1, and a bar code disc 5 which integrally actuates with the supply spool 2 is partially represented at the cutouts 4a and 4b.

Figure 5:
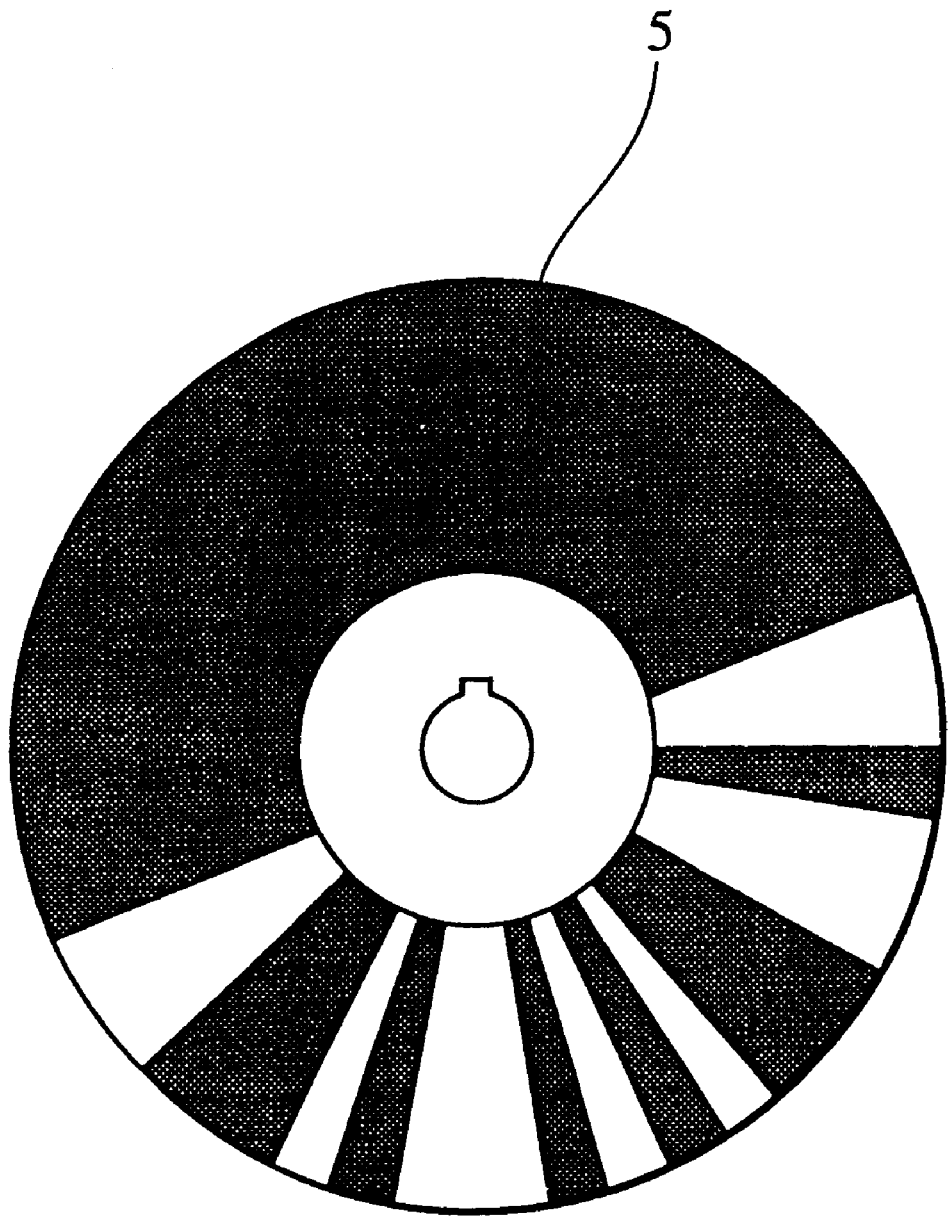
FIG. 5 illustrates a form of the bar code disk 5 in the film cartridge of FIG. 1.

FIG. 5 illustrates a form of the bar code disk 5. On the bar code disk 5, there are provided bright and dark bar codes covering substantially half thereof. Both of the bright and dark bar codes include wide and thin bars. These wide and thin bars are combined to record information as to the film, such as a specified number of frames capable of being used for photographing, ISO speed, type of the film, e.g., negative film or positive film, and color film or black & white film. The bar code information can be optically read from the cutouts 4a and 4b.

A substantially semicircular portion of the bar code disk 5 on which no bar code is provided is used for detecting a reference position when reading the bar code information, or for positioning the supply spool 2 when displaying an exposure state of the film by the index mark 2a.

FIG. 6 is a block diagram which illustrates a circuit configuration of a camera according to this embodiment.

Referring to FIG. 6, there are provided a control circuit 11 which conducts the entire operation of the camera composed of a microcomputer and the like having a register, RAM and ROM, an AE/AF control circuit 12 which includes a distance-measuring circuit for measuring a distance to an object and a light-measuring circuit, and which opens and closes a shutter for controlling the exposure of the film in accordance with a focusing operation of a lens for photographing (not shown) and the brightness of the object, and non-volatile read-only memory (EEPROM) 13 which is used for writing adjusting data in a manufacturing step, and for storing information and operating conditions of a film counter during operation of the camera.

PWM (Pulse Width Modulation) control circuits 14 and 17 generate a PWM signal which equivalently controls motor current by a signal-on pulse width, and the duty ratio of the PWM signal can be changed by a command from the control circuit 11. There are also provided motor driving circuits 15 and 18, a film transporting motor 16 for transporting and rewinding the film, and a cartridge motor 19 for ejecting the film cartridge. The motor driving circuit 15 controls the driving of the film transporting motor 16 by the PWM signal from the control circuit 14. The motor driving circuit 18 controls the driving of the cartridge motor 19 by the PWM signal from the PWM control circuit 17. By varying the duty ratio of the PWM signal, operating speeds of the film transporting motor 16 and the cartridge motor 19 can be changed. A photo reflector control circuit 20 actuates a photo reflector 21 to project infrared lights on the turning bar code disk 5, and detects the reflected lights to compare a detection level with a suitable level, thereby detecting bar code signals on the bar code disk 5 as binary signals of bright and dark. A photo reflector control circuit 22 also actuates a photo reflector 23 to perform similar operations as described above. The photo reflector 21 detects bar code signals on the bar code disk 5 from the cutout 4a, and the photo reflector 23 detects bar code signals on the bar code disk 5 from the cutout 4b.

A release switch 24 starts a release operation of the camera when it is manually turned on. A rewind switch 25 performs a rewinding operation when it is turned on. When a cartridge eject switch 26 is turned on after completion of the rewinding operation of the film, the film cartridge is ejected from the camera. A cartridge loading completion detecting switch 27 is turned on when loading of the film cartridge into a cartridge chamber is completed.

A photo reflector 29 detects perforations of the film. A photo reflector control circuit 28 actuates the photo reflector 29 to project infrared rays on the side end portions of the film, and detects the reflected lights to compare a detection level with a suitable level, thereby detecting perforation signals as binary signals of bright and dark.

A magnetic head 31 performs recording to a magnetic material coated on the surface of the film, and reads information recorded in the magnetic material. A magnetic head control circuit 30 controls the magnetic head 31. The control circuit 11 actuates the magnetic head 31 through the magnetic head control circuit 30, and records information such as the time (or the date) of photographing and photographic conditions at the same time as when one frame of the film is wound-up and transported, so that the information can be used when printing a photograph. The control circuit 11 is also used for detecting unexposed frames of the film which has frames partially used for photographing.

An operation of the camera having the circuit configuration shown in FIG. 6 will now be described with reference to a flowchart of the control circuit shown in FIG. 7

The following steps (hereinafter, abbreviated as "S") 100 to 113 represent operations from the loading of the film cartridge to the completion of film loading operation.

(S100)

In S100, the cartridge loading completion detecting switch 27 is on stand by. Since loading of the film cartridge is not completed during the cartridge loading, the cartridge loading completion detecting switch 27 is OFF, and S100 is repeated. Upon completion of loading of the film cartridge, the cartridge loading completion detecting switch 27 is turned on, and the procedure advances to S101.

(S101)

When loading of the film cartridge is completed, the control circuit 11 actuates the film transporting motor 16 in the direction of rewinding of a film through the PWM control circuit 14 and the motor driving circuit 15 in order to judge which exposure state of the film is displayed by the film cartridge, and turns the bar code disk 5 of the film cartridge. Then, the procedure advances to S102.

(S102)

In S102, information about the exposure state of the film displayed by the film cartridge is read out. This reading out is performed by actuating the photo reflectors 21 and 23 with the photo reflector control circuits 20 and 22 at the same time of the turning of the bar code disk 5 to check how the bar code signals on the bar code disk 5 are output from the photo reflectors in the initial turning condition of the bar code disk 5. As a result, it can be determined in which angular position the bar code disk 5 has been stopped at the time of loading of the film cartridge. The details of the method for judging the angular position will be described later. When reading out of the exposure state of the film displayed by the film cartridge is completed, the procedure advances to S103.

(S103)

In S103, the information of the exposure state of the film displayed by the film cartridge, which is read out in S102, is written in the EEPROM 13. This is because the information of the exposure state displayed on the film cartridge cannot be judged unless the bar code disk 5 is turned. The information of the exposure state of the film displayed by the film cartridge, once it is read, is stored in a non-volatile storage device so as to be accommodated after battery replacement due to the drop in the battery voltage. Then, the procedure advances to S104.

(S104)

In S104, the bar code information on the bar code disk 5 is read and decoded. The bar code information is read by the use of the photo reflector control circuits 20 and 22, and the photo reflectors 21 and 23. A dark section covering half of the bar code disk 5 is detected, and the bright and dark pattern is recognized as bar code information, which starts from a bright pattern corresponding to the bright signal which appears immediately after the signal of the dark half. By decoding the bar code information, information such as the specified number of frames capable of being used for photographing, ISO speed, and the film type can be obtained. Then, the procedure advances to S105.

(S105)

In S105, information such as the specified number of frames capable of being used for photographing, ISO speed, and the film type, which are decoded in S104, are written in the EEPROM 13. Unlike a display of the exposure state of the film, the information can be judged by reading the bar code information at any time after the cartridge is loaded. However, after the film is wound, the bar code information cannot be read freely during transportation of the film for the purpose of detecting the frame position and the like. Thus, the information is stored in a non-volatile storage device in consideration of the situation at the time of battery replacement. Then, the procedure advances to S106.

(S106)

In S106, it is judged whether the exposure state of the film displayed by the film cartridge, which is read in S102, is "all-frames exposed", or "developed". The film in the "all-frame exposed" state, or in the "developed" state cannot be used for photographing. Thus, when the loaded film cartridge displays such exposure states of the film, subsequent film loading operation and photographing operation are not performed, and the procedure advances to S124 to stop energization for rewinding the film. When the film cartridge displays the "unexposed" or "partially exposed" state of the film, the procedure advances to S107.

(S107)

When the procedure advances up to S107, a film may be transported from the loaded film cartridge. Thus, energization for rewinding the film is performed in S101 to S106. However, in S107, the rewinding energization is stopped, and in order to transport the film from the film cartridge, the control circuit 11 rotates the film transporting motor 16 in the direction of winding of the film through the PWM control circuit 14 and the motor driving circuit 15. Then, the procedure advances to S108.

(S108)

In S108, it is judged whether the exposure state of the film displayed by the film cartridge, which is read in S102, is "partially exposed". If "partially exposed", the procedure advances to S111. if not, the exposure state of the film is "unexposed". In this case, the procedure advances to S109.

(S109)

If the exposure state of the film displayed by the loaded film cartridge is judged to be "unexposed" in S108, the procedure advances to S109, and the film is wound until the first frame thereof is set to a position where photographing can be performed, while detecting perforations of the film by the photo reflector control circuit 28 and the photo reflector 29. Upon completion of winding of the film, energization in the direction of winding of the film is stopped, and the procedure advances to S110.

(S110)

In S110, the control circuit 11 sets a flag in the internal RAM thereof which represents that the exposure state of the film displayed by the loaded film cartridge is "unexposed". Then, the procedure advances to S113.

(S111)

If the exposure state of the film displayed by the loaded film cartridge is judged to be "partially exposed" in S108, the procedure advances to S111, and the film is wound until an unexposed frame thereof is detected. The unexposed frame is detected by detecting the presence or absence of a magnetic record recorded on the film surface by the magnetic head control circuit 30 and the magnetic head 31.

The magnetic head control circuit 30 and the magnetic head 31 record various information in the film having the surface coated with a magnetic material at each frame.

Since such information is not recorded in an unexposed frame, an unexposed frame can be judged by detecting the presence or absence of the magnetic record.

When the film is wound until the first unexposed frame thereof is set to the position where photographing can be performed, energization in the direction of winding of the film is stopped, and the procedure advances to S112.

(S112)

In S112, the control circuit 11 sets a flag in the internal RAM thereof which represents that the exposure state of the film displayed by the film loaded film cartridge is "partially exposed". Then, the procedure advances to S113.

(113)

After completion of winding the film, information such as the number of frames currently set and a flag representing the exposure state of the film is stored in the EEPROM 13. The operation for loading the film is completed by the above-mentioned operations, and the procedure advances to S114 to S115 where a photographing operation and a rewinding operation of the film are on stand by.

(S114)

In S114, it is judged whether or not the release switch 24 is turned on. If turned on, the procedure advances to S116. If not, the procedure advances to S115.

(S115)

In S115, it is judged whether or not the rewind switch 25 is turned on. If turned on, the procedure advances to S122. If not, the procedure returns to S114 to repeat the operations in S114 to S115.

(S116)

When the release switch 24 is actuated in S114, the procedure advances to S116. S116 to S120 represent a sequence relating to a photographing operation.

In S116, the control circuit 11 performs known photographing operations such as distance-measuring, metering, recharge of an electric flash, focusing, shutter control, and control of the electric flash, so as to expose the film. Then, the procedure advances to S117.
(S117)

In S117, the control circuit 11 sets a flag in the internal RAM thereof which represents that the exposure state of the film displayed by the film cartridge is "partially exposed", whereby the exposure state of the film is changed from "unexposed" to "partially exposed" even if one frame is used for photographing. Then, the procedure advances to S118.
(S118)

In S118, one frame of the film is wound by the PWM control circuit 14, motor driving circuit 15 and film transporting motor 16, while detecting perforations of the film by the photo reflector control circuit 28 and photo reflector 29. At this time, various information, such as the date of photographing, whether or not the electric flash is used, magnification, focal length, aperture, shutter speed, the brightness of scene to be photographed, back light or follow light, etc. are recorded on the surface of the film by the magnetic head 31 through the magnetic head control circuit 30. When the one-frame winding is completed, the procedure advances to S119.
(S119)

In S119, it is judged whether or not the maximum number of frames capable of being used for photographing have been used for photographing by using the information about the specified number of frames capable of being used for photographing of the loaded film, which is read in S104.

If all frames have been used, the procedure advances to S121. If not, the procedure advances to S120.

In order to detect that all of the frames have been used for photographing, an index mark indicating the end of the film may be detected during the winding of the film in S118, and tension of the film produced when it is transported may be judged.
(S120)

If the maximum number of frames capable of being used for photographing have not been used for photographing, a counter provided within the control circuit 11 is reset to the new frame number, and the frame number information and the flag of the exposure state (always "partially exposed") are written in EEPROM 13. Then, the procedure returns to S114 or S115 so as to judge again whether or not the release switch 24 or the rewind switch 25 is actuated.
(S121)

If the maximum number of frames capable of being used for photographing is judged to have been used for photographing in S119, the procedure advances to S121. In S121, since all of the frames are used, the control circuit 11 sets a flag in the internal RAM thereof which represents that the exposure state of the film displayed by the loaded film cartridge is "all-frames exposed". Then, the procedure advances to S122.
(S122)

When the maximum number of frames capable of being used for photographing have been used for photographing, or the rewind switch is actuated to rewind the film in the course of photographing in S115, the procedure advances to S122.

In S122, a flag representing the rewinding state and a flag representing the exposure state of the film are stored in the EEPROM 13. This is because that, in order to restart the rewinding operation when a power source is reset in the course of the rewinding operation, it is necessary to store information of halfway rewinding of the film in a nonvolatile storage medium. Then, the procedure advances to S123.
(S123)

In S123, the film is rewound. The control circuit 11 performs the film rewinding by rotating the film transporting motor 16 in the direction of rewinding of the film through the PWM control circuit 14 and the motor driving circuit 15.

After a predetermined length of time expires since the photo reflector 29 has ceased to detect the film through the photo reflector control circuit 28, film rewinding is completed. When film rewinding is completed, the procedure advances to S124.

As regards detection of the completion of film rewinding, the fact that the film is rewound in the film cartridge may be detected by an input of a signal from an input means (not shown) in the judgement of the user.
(S124)

When film rewinding is completed, or when the film cartridge displaying the "all frames exposed" or "developed" state of the film is loaded, S124 is performed.

In S124, energization in the direction of rewinding of the film is suspended to stop the driving of the film transporting motor 16. Then, the procedure advances to S125.
(S125)

In S125, it is judged whether or not the cartridge eject switch 26 is turned on. When the cartridge eject switch is turned off, the procedure in S125 is repeated until the cartridge eject switch is turned on. When the cartridge eject switch 26 is turned on, the procedure advances to S126.
(S126)

In S126, a display of the exposure state of the film is set. The details of this operation will be described later. After the exposure state of the film is set, the procedure advances to S127.
(S127)

In S127, the cartridge motor 19 is driven in the direction of ejecting of the cartridge through the PWM control circuit 17 and the motor driving circuit 18, whereby the cartridge 1 is ejected from the camera. When the cartridge is ejected, the steps of operations are completed.

By the operations as described above, if the film is rewound with the unexposed film set and never used for photographing, the display of the exposure state of the cartridge is set to "unexposed".

When a partially exposed film is set, or the unexposed film is set and used for photographing even one time, and when the film is rewound before the maximum number of frames capable of being used for photographing are used for photographing, the display of the exposure state of the cartridge is set to "partially exposed".

When the maximum number of the frames capable of being used for photographing have been used for photographing, the display of the exposure state of the cartridge is set to "all-frames exposed".

The reading operation of the information of the exposure state of the film displayed by the film cartridge, which is performed in S102 will now be described. FIGS. 8A to 8D illustrate examples of a relation between the display of the exposure state of the film cartridge and the position of the bar code disk 5. For easy understanding, it is illustrated in FIGS. 8A to 8D so that the whole bar code disk is represented. As previously described, since the index mark 2a for displaying outwardly the exposure state of the film and the bar code disk 5 rotate integrally with the film supply spool 2, the exposure state displayed by the index mark 2a corresponds to the stop position of the bar code disk 5.

Figure 8A:
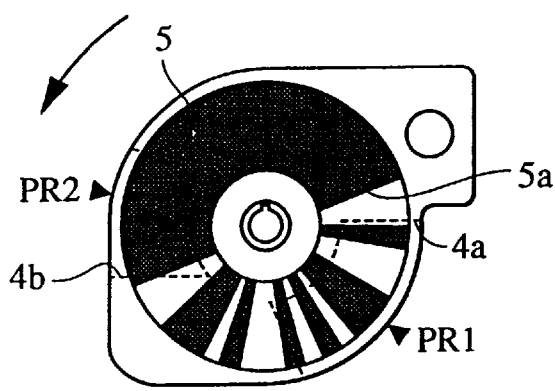
FIGS. 8A to 8D illustrate a relation between the display of the exposure state of the film cartridge and the position of the bar code disk 5 according to the embodiments of the present invention.
Figure 8B:
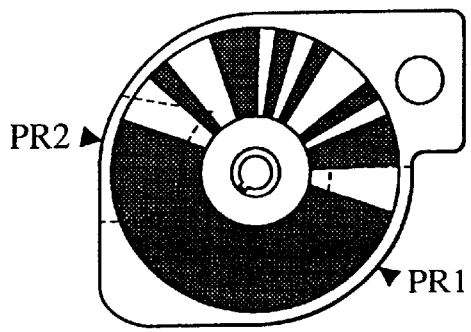
Figure 8C:
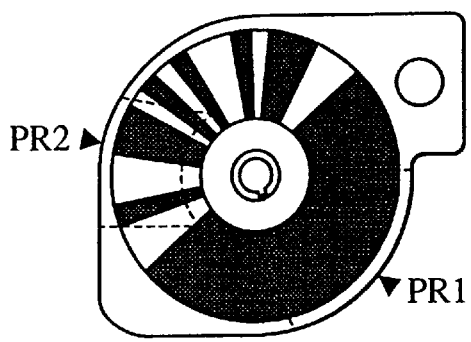
Figure 8D:
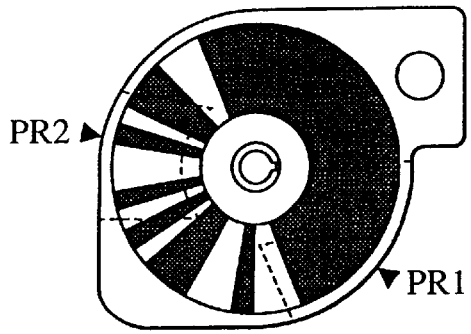

FIG. 8A illustrates the position of the bar code disk 5 when the index mark 2a indicates the "unexposed" state of the film; FIG. 8B illustrates the position of the bar code disk 5 when the index mark 2a indicates the "partially exposed" state of the film; FIG. 8C illustrates the position of the bar code disk 5 when the index mark 2a indicates the "all-frames exposed" state of the film; and FIG. 8D indicates the position of the bar code disk 5 when the index mark 2a indicates the "developed" state of the film.

An arrow in FIG. 8A represents a rewind direction of the film. The bar code disk 5 is turned in the direction of the arrow when the exposure information is read and the display of the exposure state is set. Delta symbols PR1 and PR2 pointing to the cutouts 4a and 4b shown in broken lines represent the positions where the photo reflectors 21 and 22 read the bar code, respectively.

A bright edge 5a which appears immediately after the dark section of the bar code disk 5 covering the half thereof is the reference edge for reading the bar code information.

When the display of the exposure state corresponds to the position of the bar code disk as shown in FIGS. 8A to 8D, the exposure state displayed by the film cartridge is judged as follows.

Figure 9:
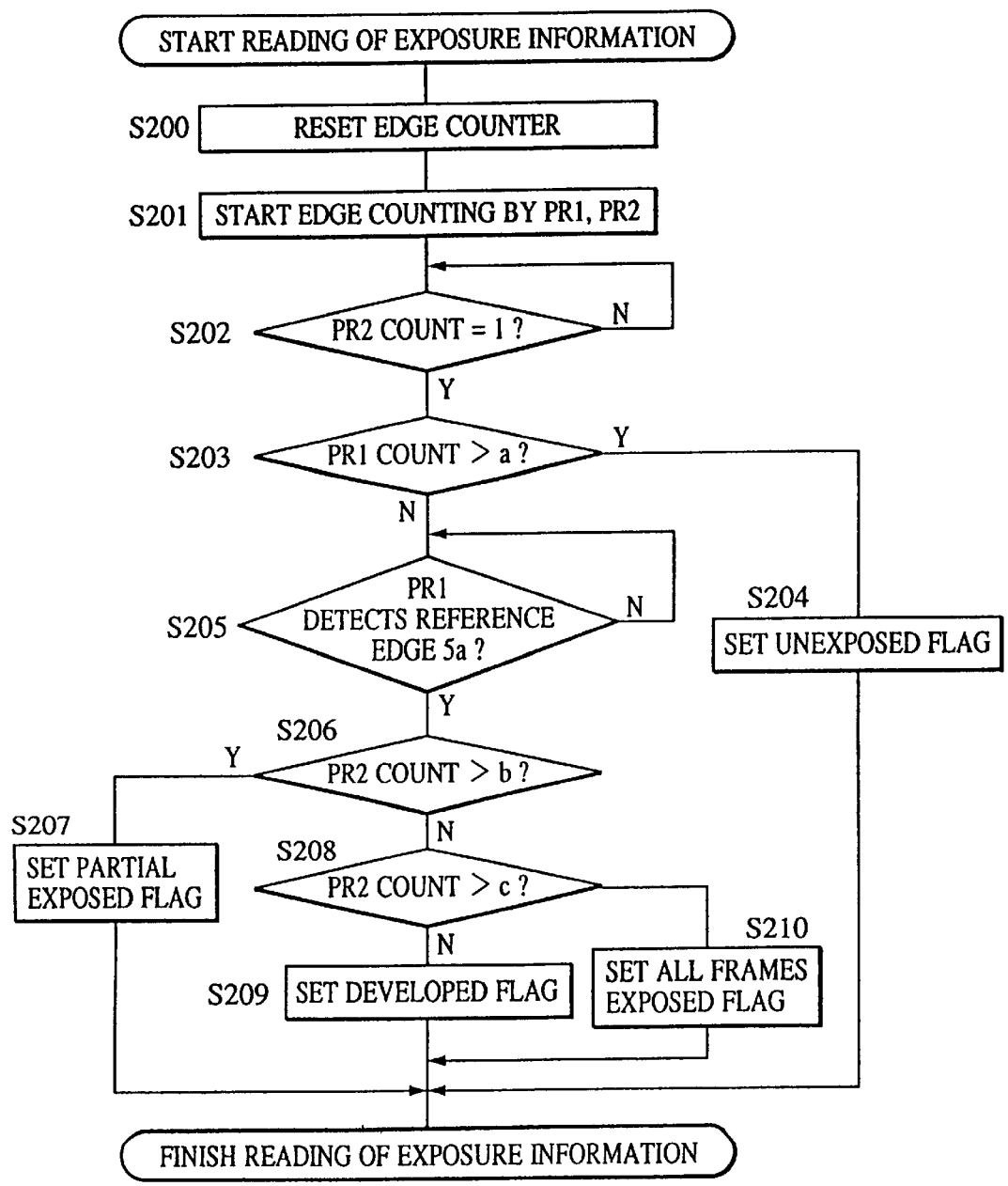
FIG. 9 is a flowchart of steps for reading the exposure state.

FIG. 9 is a flowchart of the control circuit 11 which illustrates the operation of reading of the exposure state of the film displayed by the film cartridge, which is performed in the above S102.

Before the steps are is performed, energization in the direction of rewinding of the film is performed in S101.

(S200)

When the reading of the exposure information is started, S200 is performed in the first place. In S200, edge counters for counting bright and dark edges (including both of bright to dark, and dark to bright) on the bar code disk 5 are reset to "0". The edge counters are provided as event counters which are stored in RAM of the control circuit 11, or contained in the control circuit 11 as peripheral circuits. The edge counters are provided separately for the photo reflector 21 (PR1 in FIG. 9) and for the photo reflector 23 (PR2 in FIG. 9). After the edge counters are reset, the procedure advances to S201.

(S201)

In S201, the control circuit 11 actuates the photo reflector control circuits 20 and 22, and photo reflectors 21 and 23 to start detection of the bar code edges of the bar code disk 5. Every time the photo reflectors count the bar code edges, the edge counters are incremented by 1, and the procedure advances to S202.

(S202)

In S202, it is judged whether or not the edge counter of the photo reflector 23 has counted "1" while counting bar code edges. If not, the step S202 is repeated while continuing a counting of the bar code edges. If so, the procedure advances to S203.

(S203)

In S203, it is judged whether or not the number of edges counted by the edge counter of the photo reflector 21 when the edge counter of the photo reflector has counted "1" is larger than a predetermined number a. If larger than a, the exposure state of the film is judged as "unexposed", and the procedure advances to S204. If not, the procedure advances to S205. The predetermined number a is 8 to 9 in the case of the bar code disk 5 shown in FIGS. 8A to 8D.

(S204)

In S204, since the exposure state of the film is judged as "unexposed", a flag representing the exposure state of the film is set to "unexposed" to end the reading of the exposure information.

(S205)

In S205, it is checked whether or not the photo reflector 21 detects the reference edge 5a which appears immediately after the dark section covering substantially half of the bar code disk 5. If the reference edge 5a is detected, the procedure advances to S206. If not detected, the step S205 is repeated until the reference edge 5a is detected.

The reference edge 5a is detected by the following methods: The bright edge which appears immediately after the dark edge detected during the period of time longer than the predetermined time is recognized as the reference edge. It is determined how many edges are counted by the photo reflector 23 while the photo reflector 21 detects the dark to bright edge, and the dark to bright edge is recognized as the reference edge if more than the predetermined number of edges are counted.

(S206)

In S206, it is determined how many edges are counted by the edge counter of the photo reflector 23 until the reference edge 5a is detected by the photo reflector 21 from the start of energization for rewinding the film. If the number of edges counted by the edge counter of the photo reflector 23 exceeds a predetermined number b, the exposure state of the film is judged as "partially exposed", and the procedure advances to S207. If not, the procedure advances to S208. The predetermined number b is 12 to 13 in the case of the bar code disk 5a shown in FIGS. 8A to 8D.

(S207)

In S207, since the exposure state of the film is judged as "partially exposed", a flag representing the exposure state of the film is set to "partially exposed" to end the reading of the exposure information.

(S208)

In S208, it is checked whether the number of edges counted by the edge counter of the photo reflector 23 until the reference edge 5a is detected after the start of the rewinding energization exceeds a predetermined number c. If exceeded, the exposure state of the film is judged as "all-frames exposed", and the procedure advances to S210. If not, the exposure state of the film is judges as "developed", and the procedure advances to S209. The predetermined number b is larger than the predetermined number c. The predetermined number c is 7 to 8 in the case of the bar code disk 5 shown in FIGS. 8A to 8D.

(S209)

In S209, since the exposure state of the film is judged as "developed", a flag representing the exposure state of the film is set to "developed" to end the reading of the exposure information.

(S210)

In S210, since the exposure state of the film is judged as "all-frames exposed", a flag representing the exposure state of the film is set to "all-frames exposed" to end the reading of the exposure information.

A setting of the display of the exposure state of the film cartridge performed in the above S126 will now be described. In order to display the exposure state, the bar code disk 5 may be stopped at each position shown in FIGS. 8A to 8D in accordance with each exposure state of the film, i.e., "unexposed", "partially exposed", "all-frames exposed" and "developed".

FIG. 10 is a flowchart of the control circuit 11 which illustrates the operation of setting the exposure state of the film displayed by the film cartridge, which is performed in the above S126.

(S300)

In S300, the film transporting motor 16 is driven in the direction of rewinding of the film, and the procedure advances to S301.

(S301)

In S301, the control circuit 11 actuates photo reflector control circuits 20 and 22, and the photo reflector 21 (PR1 in FIG. 10) and 23 (PR2 in FIG. 10) to start detection of the bar code edges of the bar code disk 5. Every time the photo reflectors count the bar code edges, the edge counters are incremented by 1, and the procedure advances to S302.

(S302)

In S302, it is checked whether or not the photo reflector 21 detects the reference edge 5a which appears immediately after the dark section covering substantially half of the bar code disk 5. If the reference edge 5a is detected, the procedure advances to S303. If not detected, the step S302 is repeated until the reference edge 5a is detected. The reference edge 5a is detected by the same methods as those described in S205.

(S303)

In S303, the edge counter for the photo reflector 21 is reset to 0, and the procedure advances to S304.

(S304)

In S304, the control circuit 11 determines whether the exposure state of the film to be displayed is "unexposed" with reference to the flag set in the internal RAM thereof. If "unexposed" is set, the procedure advances to S312. If not, the procedure advances to S305.

(S305)

In S305, the control circuit 11 determines whether the exposure state of the film to be displayed is "partially exposed" with reference to the flag set in the internal RAM thereof. If "partially exposed" is set, the procedure advances to S311. If not, the procedure advances to S306.

(S306)

In S306, it is checked whether or not the photo reflector 23 detects the reference edge 5a which appears immediately after the dark section covering substantially half of the bar code disk 5. If the reference edge 5a is detected, the procedure advances to S307. If not detected, the step S306 is repeated until the reference edge 5a is detected. The reference edge 5a is detected by the same methods as those described in S205 in which the reference edge is detected by the photo reflector 21.

(S307)

In S307, the edge counter for the photo reflector 23 is reset to 0, and the procedure advances to S308.

(S308)

In S308, the control circuit 11 determines whether the exposure state of the film to be displayed is "all-frames exposed" with reference to the flag set in the internal RAM thereof. If "all-frames exposed" is set, the procedure advances to S313. If not, the display of the exposure state is set to "developed". Thus, procedure advances to S309.

(S309)

In S309, the display of the exposure state is set to "developed", and it is checked whether the number of edges counted by the edge counter of the photo reflector 23 reaches the predetermined number g. If the count reaches the predetermined number g, the procedure advances to S310. If not, S309 is repeated until the number of edges counted by the edge counter reaches the predetermined number g. The predetermined number g is 9 in the case of the bar code disk 5 shown in FIGS. 8A to 8D.

(S310)

When the procedure has advanced to S310, the bar code disk 5 has reached a predetermined position for displaying the exposure state. Thus, the film transporting motor 16 is stopped to end the setting of the display of the exposure state.

(S311)

In S311, the display of the exposure state is set to "partially exposed", and it is checked whether the number of edges counted by the edge counter of the photo reflector 21 has reached the predetermined number e. If the count reaches the predetermined number e, the procedure advances to S310. If not, S311 is repeated until the number of edges counted by the edge counter reaches the predetermined number e. The predetermined number e is 14 in the case of the bar code disk 5 shown in FIGS. 8A to 8D.

(S312)

In S312, the display of the exposure state is set to "unexposed", and it is checked whether the number of edges counted by the edge counter of the photo reflector 21 has reached the predetermined number d. If the count reaches the predetermined number d, the procedure advances to S310. If not, the step S312 is repeated until the number of the edges counted by the edge counter reaches the predetermined number e. The predetermined number e is 4 in the case of the bar code disk 5 shown in FIGS. 8A to 8D.

(S313)

In S313, the display of the exposure state is set to "all-frames exposed", and it is checked whether the number of edges counted by the edge counter of the photo reflector 23 has reached the predetermined number f. If the count reaches the predetermined number f, the procedure advances to S310. If not, the step S313 is repeated until the number of the edges counted by the edge counter reaches the predetermined number f. The predetermined number f is 4 in the case of the bar code disk 5 shown in FIGS. 8A to 8D.

As described above, according to this embodiment, the display of the exposure state of the film is set immediately before the ejection of the film cartridge. Thus, even if shock and vibration are applied to the film cartridge between the completion of the film rewinding and the ejection of the film cartridge, it does not affect the display of the exposure state of the film, thus causing no shifts or errors of the display.

According to this embodiment, when a film cartridge, which displays the "partially exposed" state of the film, is loaded, the film is wound until an unexposed frame is detected. However, when information as to whether or not the photographing is performed is magnetically recorded in the film, it is likely that an inexpensive camera does not include a circuit for reading such information recorded in the film.

When the film cartridge which displays the "partially exposed" state of the film, is loaded, such an inexpensive camera can identify that the film is in the "partially exposed" state, but can not detect the position of the unexposed frame, so that the film is not wound to the position of the unexposed frame to prevent double exposure of the film which is already used for photographing.

Therefore, in such an inexpensive camera, when the film cartridge, which displays the "partially exposed" state of the film, is loaded, the film cartridge may be ejected by adjusting the index mark 2a to the position showing the "all-frames exposed" state of the film without loading the film. In addition, when a film which has frames partially used for photographing is wound, the display of the film cartridge may be set to "all-frames exposed".

Further, when a film cartridge, which displays the "developed" state of the film, is loaded, the camera may be handled in the same manner as that of the film cartridge which displays the "all-frames exposed" state of the film. In this case, the index mark set on the camera side shows the positions merely "unexposed" and "all-frames exposed" state of the film.

According to the first embodiment as described above, the display of the exposure state of the film is always set after the actuation of the cartridge eject switch 24. It is common that the film cartridge is ejected immediately after the completion of rewinding of the film. In the first embodiment, however, even if the film cartridge is to be ejected, the film transporting motor 16 is driven in the direction of rewinding of the film to set the display of the exposure state after the film rewinding is completed and the motor 16 is stopped. Therefore, it takes a long period of time from the actuation of the cartridge eject switch 24 to the actual ejection of the cartridge.

A second embodiment described below will overcome the above-described point.

Since the circuit configuration of this embodiment is same as that in the first embodiment shown in FIG. 6, it is quoted in this embodiment.

Figure 11B:
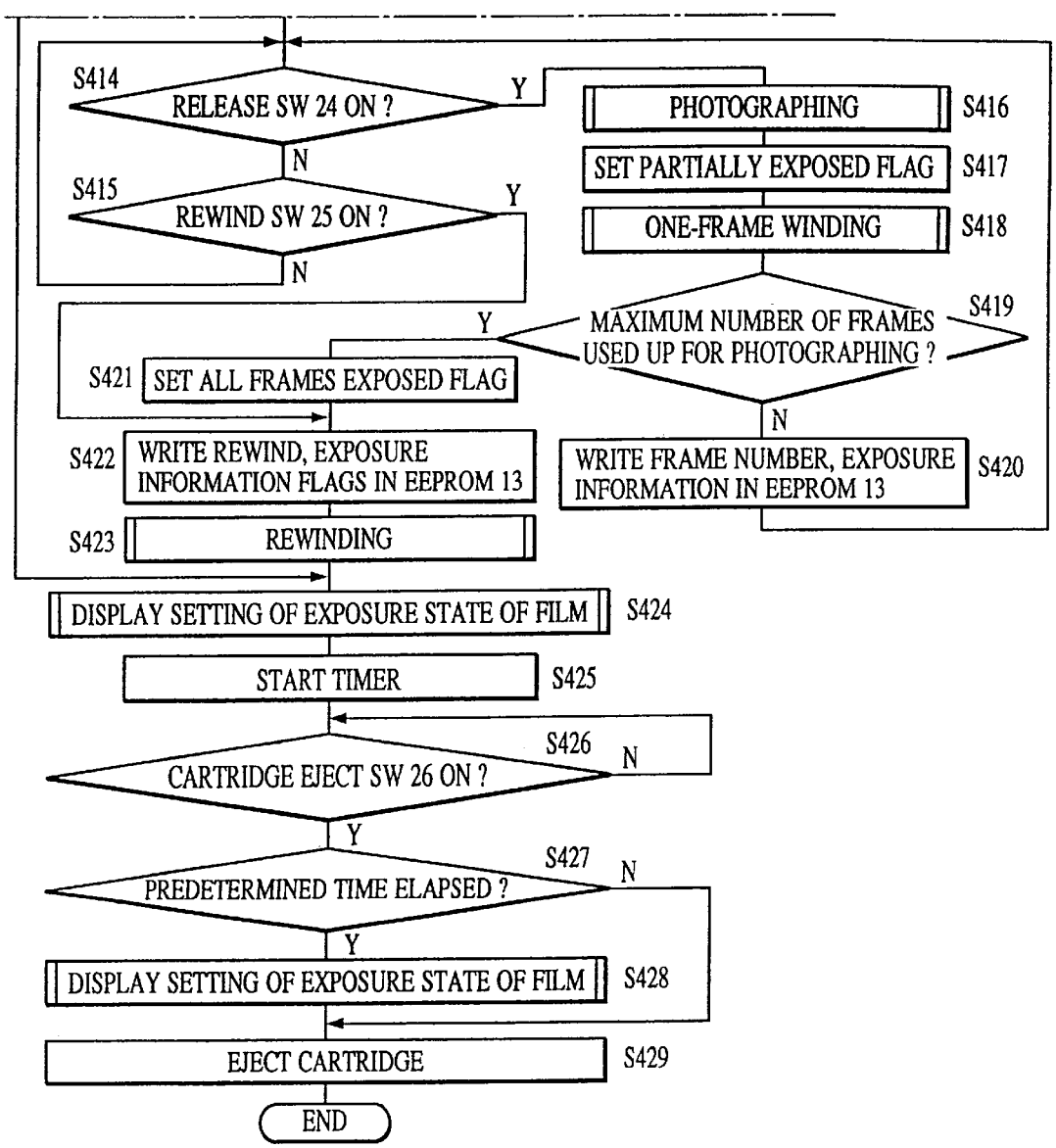
FIG. 11, consisting of FIGS. 11A and 11B, is a flowchart of a control circuit 11 according to a second embodiment of the present invention.

FIG. 11 is a flowchart of the control circuit 11 of FIG. 6 according to this embodiment, and operations of this embodiment will be described with reference to the flowchart.

Since the operations of S400 to S423 shown in FIG. 11 are the same as those of the S100 to S123 shown in FIG. 7 (the last two digits in the steps S400 to S423 in FIG. 11 correspond to those of the S100 to S123 in FIG. 7), only the differences between the operations of S100 to S123 and the S400 to S423 will be described, and detailed explanation thereof has been omitted.

Figure 7B:
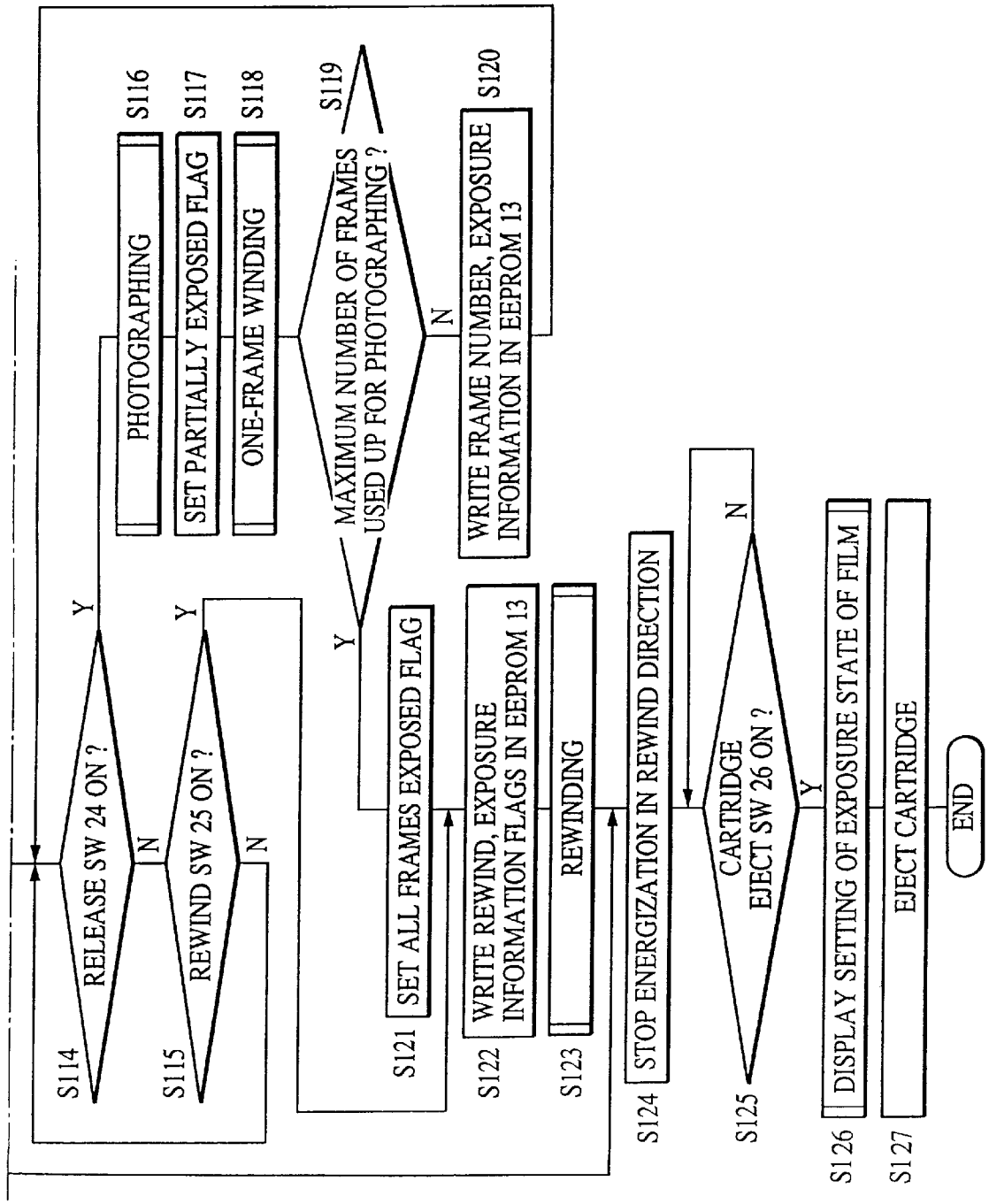
FIG. 7, consisting of FIGS. 7A and 7B is a flowchart of a control circuit 11 of FIG. 6.

The operations in S400 to S423 of the second embodiment differ from those of in S100 to S123 of the first embodiment in that the operation of S424 which is performed when the film cartridge displaying the "all-frames exposed" or "developed" state of the film is loaded in S406 does not correspond to that of S124 in FIG. 7, and that the film transporting motor 16 is not stopped in S423 even if the completion of rewinding of the film is detected.

The operations of S424 and afterward will now be described.

(S424)

When the rewinding of the film (S423) is completed, or when the film cartridge displaying the "all-frame exposed" or "developed" state of the film is loaded (S406), S424 is performed. The display of the exposure state of the film is initially set in S424. This operation is different from that of the first embodiment. Since the film transporting motor 16 is left driven in the direction of rewinding of the film, it is not necessary to drive the motor 16 again. Since the operations for setting the display of the exposure state of the film are the same as those of described in S300 to S313 of the first embodiment, the explanation thereof has been omitted. When the setting of the display of the exposure state of the film is completed, the procedure advances to S425.

(S425)

In S425, a timer provided in the control circuit 11 is started, and the procedure advances to S426.

(S426)

In S426, it is judged whether or not the cartridge eject switch 26 is turned on. When the cartridge eject switch is turned off, the procedure in S426 is repeated until the cartridge eject switch is turned on. When the cartridge eject switch 26 is turned on, the procedure advances to S427.

(S427)

In S427, the timer started in S425 determines whether or not the time elapsed from the setting of the display of the exposure state of the film in S424 to the actuation of the cartridge eject switch 26 for ejecting the cartridge is longer than a predetermined time. The predetermined time is measured, for example, in several minutes. If the elapsed time is within the predetermined time, it is shorter than the length of time that the display of the exposure state of the film set in S424 is shifted so that the exposure state cannot be discriminated, even if shock is not likely to be added after rewinding of the film, or vibration is added. If the timer determines the elapsed time to be longer than the predetermined time, the procedure advances to S428. If the timer determines the elapsed time to be within the predetermined time, the procedure advances to S429 without passing the operation of S428.

(S428)

In S428, the display of the exposure state of the film is set again in the same manner as that of S424. Since the operations for setting the display of the exposure state of the film is also the same as those of described in S300 to S313 of the first embodiment, the explanation thereof has been omitted. After the operation of S428 is completed, the procedure advances to S429.

(S429)

In S429, the control circuit 11 actuates the cartridge motor 19 in the direction of ejecting of the cartridge through the PWM control circuit 17 and the motor driving circuit 18 to eject the cartridge 1 from the camera. When the cartridge is ejected, the steps of operation are completed.

As described above, according to this embodiment, when the cartridge is ejected immediately after the completion of the rewinding of the film, the display of the exposure state of the film immediately before the ejection of the cartridge is not set again. Thus, the cartridge is ejected quickly after the actuation of the cartridge eject switch 26.

In addition, when the camera is left in a state where the rewinding of the film is completed, even if the display of the exposure state of the film is shifted due to vibration and shock, the display of the exposure state of the film is set again upon ejection of the cartridge to eliminate shifts and errors of the display. Therefore, an impact upon leaving the camera due to vibration and shock has no effect.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, according to the embodiments as described above, the display of the film cartridge set in S126 and S424 or S428 is the information of the usage condition of the film. However, a case can be applied to the present invention where information other than the service condition of the film is set. In addition, according to the embodiments as described above, the display of the film cartridge is set in response to the actuation of the cartridge eject switch 26. However, any operation can be applied to the present invention so long as it is the operation for ejecting the cartridge, such as an operation for opening a cover of the cartridge chamber.

Further, the display of the film cartridge may be automatically reset at predetermined times between the S424 and S428 of the control circuit 11. In this case, the time elapsed after the last reset of the display of the film cartridge may be recognized as the elapsed time S427 of the control circuit 11.

Still further, according to the second embodiment as described above, whether or not it is necessary to reset the display of the film cartridge is judged (judgement of a shift of the display of the film cartridge) on the basis of the time elapsed after setting of the display of the film cartridge. However, any judgement method can be applied to the present invention. For example, the necessity of resetting of the display of the film cartridge may be judged on the basis of detection results of a sensor which can detect action of vibration and shock.

A cartridge of a form other than that described in the above embodiments, such as a cartridge having an image recording medium other than the film and further, other types of cartridges and a loading substance other than the cartridge, such as a battery, are applicable to the present invention.

In addition, software configuration and hardware configuration in the above embodiments may be suitably replaced.

Further, according to the present invention, each of the embodiments as described above and modifications thereof, or technical elements thereof may be combined, if needed.

Still further, the present invention is applicable to various types of cameras, such as a single-lens reflex camera, a lens shutter camera, a video camera and the like. The present invention is also applicable to optical instruments and other apparatuses other than the cameras, and further, to an apparatus to be applied to those of cameras, optical instruments and other apparatuses or components thereof.

What is claimed is:

1. A camera adapted to use a film cartridge including an indicator operatively coupled to a film supply spool provided in the film cartridge, comprising:

a drive device that drives the film supply spool of a film cartridge loaded in the camera;

an ejection device that ejects a film cartridge loaded in the camera;

a setting device that sets the indicator of a film cartridge loaded in the camera by driving the film supply spool of the film cartridge, where said setting device performs a first setting operation for setting the indicator of the film cartridge in response to completion of a rewind operation of the film cartridge, and performs a second setting operation for again setting the indicator of the film cartridge, previously set in a first setting operation;

a determination device that determines whether a second setting operation is necessary; and a control device that controls said setting device so as to perform a second setting operation only when said determination device determines that a second setting operation is necessary.

2. A camera according to claim 1, wherein said control device controls said setting device so as not to perform a second setting operation when said determination device determines that a second setting operation is unnecessary.

3. A camera according to claim 1, wherein said determination device comprises a timer, and said determination device determines that a second setting operation is necessary when a period of time counted by said timer after said setting device performs a first setting operation equals a predetermined period of time.

4. A camera according to claim 3, wherein said determination device determines that a second setting operation is not necessary when the period of time counted by said timer is less than the predetermined period of time.

5. A camera according to claim 1, further comprising an rewind switch, wherein said driving device starts a rewind operation of a film cartridge loaded in the camera in response to operation of said rewind switch.

6. A camera according to claim 1, further comprising an ejection switch, wherein said ejection device starts an ejection operation of a film cartridge loaded in the camera, in response to operation of said rewind switch.

7. A camera according to claim 1, wherein said setting device sets the indicator of the film cartridge in accordance with a usage condition of a film of the film cartridge.

8. A camera according to claim 1, wherein said setting device comprises a photoreflector.

9. A camera adapted to use a film cartridge including an indicator, comprising:

a rewind device that rewinds a film of a film cartridge loaded in the camera;

an ejection device that ejects a film cartridge loaded in the camera;

a setting device that sets the indicator of a film cartridge loaded in the camera, where said setting device performs a first setting operation for setting the indicator of the film cartridge in response to a rewind operation of said rewind device, and performs a second setting operation for again setting the indicator of the film cartridge, previously set in a first setting operation, in response to an ejection operation of said ejection device;

a determination device that determines whether a second setting operation is necessary; and a control device that controls said setting device so as to perform a second setting operation only when said determination device determines that a second setting operation is necessary.

10. A cartridge indicator setting apparatus adapted to use a film cartridge including an indicator operatively coupled to a film supply spool provided in the film cartridge, comprising:

a drive device that drives the film supply spool of a film cartridge loaded in the setting apparatus;

an ejection device that ejects a film cartridge loaded in the setting apparatus;

a setting device that sets the indicator of a film cartridge loaded in the cartridge indicator setting apparatus by driving the film supply spool of the film cartridge, where said setting device performs a first setting operation for setting the indicator of the film cartridge in response to completion of a rewind operation of the film cartridge, and performs a second setting operation for again setting the indicator of the film cartridge, previously set in a first setting operation, in response to an ejection operation of said ejection device;

a determination device that determines whether a second setting operation is necessary; and a control device that controls said setting device so as to perform a second setting operation only when said determination device determines that a second setting operation is necessary.

11. A cartridge indicator setting apparatus according to claim 10, wherein said control device controls said setting device so as not to perform a second setting operation when said determination device determines that a second setting operation is unnecessary.

12. A cartridge indicator setting apparatus according to claim 10, wherein said determination device comprises a timer, and said determination device determines that a second setting operation is necessary when a period of time counted by said timer after said setting device performs a first setting operation equals a predetermined period of time.

13. A cartridge indicator setting apparatus according to claim 12, wherein said determination device determines that a second setting operation is not necessary when the period of time counted by said timer is less than the predetermined period of time.

14. A cartridge indicator setting apparatus according to claim 10, further comprising an rewind switch, wherein said driving device starts a rewind operation of a film cartridge loaded in the cartridge indicator setting apparatus in response to operation of said rewind switch.

15. A cartridge indicator setting apparatus according to claim 10, further comprising an ejection switch, wherein said ejection device starts an ejection operation of a film cartridge loaded in the cartridge indicator setting apparatus, in response to operation of said rewind switch.

16. A cartridge indicator setting apparatus according to claim 10, wherein said setting device sets the indicator of the film cartridge in accordance with a usage condition of a film of the film cartridge.

17. A cartridge indicator setting apparatus according to claim 10, wherein said setting device comprises a photoreflector.

18. A cartridge indicator setting apparatus adapted to use a film cartridge including an indicator, comprising:
- a drive device that rewinds a film of a film cartridge loaded in the setting apparatus;
- an ejection device that ejects a film cartridge loaded in the setting apparatus;
- a setting device that sets the indicator of a film cartridge loaded in the cartridge indicator setting apparatus, where said setting device performs a first setting operation for setting the indicator of the film cartridge in response to a rewind operation of said rewind device, and performs a second setting operation for again setting the indicator of the film cartridge, previously set in a first setting operation, in response to an ejection operation of said ejection device;
- a determination device that determines whether a second setting operation is necessary; and
- a control device that controls said setting device so as to perform a second setting operation only when said determination device determines that a second setting operation is necessary.

19. A camera adapted to use a film cartridge including an indicator operatively coupled to a film supply spool provided in the film cartridge, comprising:
- a drive device that drives the film supply spool of a film cartridge loaded in the camera;
- an ejection device that ejects a film cartridge loaded in the camera;
- a detection device that detects a state of the indicator operatively coupled to the film supply spool of a film cartridge loaded in the camera; and
- a control device that controls operation of said drive device, said ejection device and said detection device,
- wherein said control device controls said drive device to drive the film supply spool of a film cartridge loaded in the camera so as to rewind the film cartridge, then controls said drive device and said detection device so as to drive the film supply spool of the film cartridge and set the indicator of the film cartridge, and then, in response to an operation for starting an ejection operation of the film cartridge, determines whether a reset operation of the index of the film cartridge is necessary and, if so, controls said drive device and said detection device so as to drive the film supply spool of the film cartridge and reset the indicator of the film cartridge.

20. A camera according to claim 19, wherein, if, in response to the operation for starting an ejection operation said control device determines that a reset operation of the indicator is not necessary, said control device controls said drive device and said detection device so as not to reset the indicator of the film cartridge.

21. A camera according to claim 19, wherein said control device comprises a timer, and said control device determines that a reset operation of the indicator is necessary when the control device determines that a predetermined time period has elapsed since the indicator of the film cartridge was set.

22. A camera according to claim 21, wherein said control device determines that a reset operation of the indicator is not necessary when the predetermined time period has not elapsed since the indicator of the film cartridge was set.

23. A camera according to claim 19, further comprising a rewind switch, wherein said control device controls the drive device to start a rewind operation of the film cartridge in response to operation of the rewind switch.

24. A camera according to claim 19, further comprising an ejection switch, wherein said control device controls said ejection device so as to start an ejection operation in response to operation of said ejection switch.

25. A camera according to claim 19, wherein said control device controls said drive device and said detection device so as to drive the film supply spool of the cartridge loaded in the camera and set the indicator of the film cartridge in a state that indicates a usage condition of the film of the film cartridge.

26. A camera according to claim 19, wherein said detection device comprises a photoreflector.

27. A camera adapted to use a film cartridge including an indicator, comprising:
- a drive device that rewinds a film of a film cartridge loaded in the camera;
- an ejection device that ejects a film cartridge loaded in the camera;
- a detection device that detects a state of the indicator of a film cartridge loaded in the camera; and
- a control device that controls operation of said drive device, said ejection device and said detection device,
- wherein said control device controls said drive device so as to rewind the film in a film cartridge loaded in the camera, then controls said detection device and sets the indicator of the film cartridge, and then, in response to an operation for starting an ejection operation of the film cartridge, determines whether a reset operation of the indicator of the film cartridge is necessary and, if so, controls said detection device and resets the indicator of the film cartridge.

28. A cartridge indicator setting apparatus adapted to use a film cartridge including an indicator operatively coupled to a film supply spool provided in the film cartridge, comprising:
- a drive device that drives the film supply spool of a film cartridge loaded in the setting apparatus;
- an ejection device that ejects a film cartridge loaded in the setting apparatus;
- a detection device that detects a state of the indicator coupled to the film supply spool of a film cartridge loaded in the setting apparatus; and a control device that controls operation of said drive device, said ejection device and said detection device, wherein said control device controls said drive device to drive the film supply spool of a film cartridge loaded in the camera so as to rewind the film cartridge, then controls said drive device and said detection device so as to drive the film supply spool of the film cartridge and set the indicator of the film cartridge, and then, in response to an operation for starting an ejection operation of the film cartridge, determines whether a reset operation of the indicator of the film cartridge is necessary and, if so, controls said drive device and said detection device so as to drive the film supply spool of the film cartridge and reset the indicator of the film cartridge.

29. A cartridge indicator setting apparatus according to claim 28, wherein, if, in response to the operation for starting an ejection operation said control device determines that a reset operation of the indicator is not necessary, said control device controls said drive device and said detection device so as not to reset the indicator of the film cartridge.

30. A cartridge indicator setting apparatus according to claim 28, wherein said control device comprises a timer, and said control device determines that a reset operation of the indicator is necessary when the control determines that a predetermined time period has elapsed since the indicator of the film cartridge was set.

31. A cartridge indicator setting apparatus according to claim 30, wherein said control device determines that a reset operation of the indicator is not necessary when the predetermined time period has not elapsed since the indicator of the film cartridge was set.

32. A cartridge indicator setting apparatus according to claim 28, further comprising a rewind switch, wherein said control device controls the drive device to start a rewind operation of the film cartridge in response to operation of the rewind switch.

33. A cartridge indicator setting apparatus according to claim 28, further comprising an ejection switch, wherein said control device controls said ejection device to start an ejection operation in response to operation of said ejection switch.

34. A cartridge indicator setting apparatus according to claim 28, wherein said control device controls said drive device and said detection device so as to drive the film supply spool of the cartridge loaded in the setting apparatus and set the indicator of the film cartridge in a state that indicates a usage condition of a film of the film cartridge.

35. A cartridge indicator setting apparatus according to claim 28, wherein said detection device comprises a photoreflector.

36. A cartridge indicator setting apparatus adapted to use a film cartridge including an indicator, comprising:

a drive device that rewinds a film of a film cartridge loaded in the setting apparatus;

an ejection device that ejects a film cartridge loaded in the setting apparatus;

a detection device that detects a state of the indicator of a film cartridge loaded in the setting apparatus; and a control device that controls operation of said drive device, said ejection device and said detection device, wherein said control device controls said drive device so as to rewind the film in a film cartridge loaded in the setting apparatus, then controls said detection device and sets the indicator of the film cartridge, and then, in response to an operation for starting an ejection operation of the film cartridge, determines whether a reset operation of the indicator of the film cartridge is necessary and, if so, controls said detection device and resets the indicator of the film cartridge.

* * * * *

UNITED STATES PATENT AND TRADEMARK OFFICE
CERTIFICATE OF CORRECTION

PATENT NO. : 6,233,405 B1
DATED : May 15, 2001
INVENTOR(S) : Masao Shikaumi et al.

It is certified that error appears in the above-identified patent and that said Letters Patent is hereby corrected as shown below:

Sheet 11,
Figure 10, "ENE^GIZE" should read -- ENERGIZE --.

Sheet 12,
Figure 11A, "UNEXPOSURED" should read -- UNEXPOSED --.

Column 1,
Line 62, "cartridge;" should read -- cartridge, --.

Column 2,
Line 35, "FIG. 1 ;" should read -- FIG. 1; --.
Line 41, "7B" should read -- 7B, --.

Column 3,
Line 14, "and" should be deleted.

Column 6,
Line 8, "if" should read -- If --.
Line 47, "(113)" should read -- (S113) --.

Column 9,
Line 16, "5a" should read -- 5a, --.
Line 17, "thereof" should read -- thereof, --.
Line 27, "is" should be deleted.

Column 10,
Line 38, "judges" should read -- judged --.

Column 12,
Line 46, "the" (first occurrence) should read -- a --.
Line 47, "film," should read -- film --.

Column 13,
Line 49, "of" (first occurrence) should be deleted.

Column 14,
Line 16, "of" should be deleted.

UNITED STATES PATENT AND TRADEMARK OFFICE
CERTIFICATE OF CORRECTION

PATENT NO. : 6,233,405 B1
DATED : May 15, 2001
INVENTOR(S) : Masao Shikaumi et al.

It is certified that error appears in the above-identified patent and that said Letters Patent is hereby corrected as shown below:

Column 15,
Line 21, "as" should be deleted.

Column 19,
Line 25, "control" should read -- control device --.

Signed and Sealed this

Twenty-sixth Day of March, 2002

*Attest:*

*Attesting Officer*

JAMES E. ROGAN
*Director of the United States Patent and Trademark Office*